(12) United States Patent
Tsuchiyama

(10) Patent No.: US 7,333,817 B2
(45) Date of Patent: Feb. 19, 2008

(54) DATA TERMINAL HAVING A TELEPHONE FUNCTION

(75) Inventor: Kinya Tsuchiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 229 days.

(21) Appl. No.: 10/441,252

(22) Filed: May 20, 2003

(65) Prior Publication Data

US 2004/0023668 A1 Feb. 5, 2004

(30) Foreign Application Priority Data

May 21, 2002 (JP) ............................. 2001-145607

(51) Int. Cl.
*H04Q 7/20* (2006.01)
*H04M 1/00* (2006.01)
*H04M 3/00* (2006.01)

(52) U.S. Cl. ............................. 455/456.1; 379/356.01

(58) Field of Classification Search ............ 455/456.1, 455/414.1, 414.4; 379/354–357
See application file for complete search history.

(56) References Cited

U.S. PATENT DOCUMENTS

| | | | |
|---|---|---|---|
| 5,528,680 A | 6/1996 | Karpicke | |
| 5,592,546 A * | 1/1997 | Takahashi | 379/355.05 |
| 5,966,658 A | 10/1999 | Kennedy, III et al. | |
| 6,208,713 B1 | 3/2001 | Rahrer et al. | |
| 6,330,453 B1 * | 12/2001 | Suzuki et al. | 455/457 |
| 6,374,100 B1 | 4/2002 | Smith et al. | |
| 6,600,919 B1 * | 7/2003 | Kawase | 455/414.1 |
| 6,606,381 B1 * | 8/2003 | Wunsch | 379/356.01 |
| 7,092,370 B2 * | 8/2006 | Jiang et al. | 370/329 |
| 2002/0019731 A1 * | 2/2002 | Masui et al. | 704/7 |
| 2002/0045464 A1 * | 4/2002 | Tsuchiyama | 455/566 |
| 2002/0068599 A1 * | 6/2002 | Rodriguez et al. | 455/550 |
| 2002/0102988 A1 * | 8/2002 | Myllymaki | 455/456 |

FOREIGN PATENT DOCUMENTS

| | | |
|---|---|---|
| CN | 1348260 | 5/2002 |
| EP | 1 211 906 A2 | 11/2001 |
| GB | 2 373 681 A | 9/2002 |
| JP | 08-032669 | 2/1996 |
| JP | 10-021262 | 1/1998 |

(Continued)

OTHER PUBLICATIONS

Japanese Office Action dated Mar. 13, 2007 with a partial English translation.

(Continued)

*Primary Examiner*—William Trost
*Assistant Examiner*—Marivelisse Santiago-Cordero
(74) *Attorney, Agent, or Firm*—McGinn IP Law Group, PLLC

(57) ABSTRACT

A CPU in a cellular phone counts the number of calling times in each area in which the cellular phone resides, and stores the number of calling times for each area. The telephone numbers stored in the telephone directory file are affixed by priority orders based on the number of calling times for the area to which the telephone codes of the telephone numbers correspond. When the user wishes to display the telephone numbers on the screen of a display unit, the CPU arranges the telephone numbers in the order of the priority orders on the screen.

15 Claims, 11 Drawing Sheets

FOREIGN PATENT DOCUMENTS

| | | |
|---|---|---|
| JP | 10-304452 | 11/1998 |
| JP | 2000-165501 | 6/2000 |
| JP | 2001-028788 | 1/2001 |
| JP | 2001-069564 | 3/2001 |
| JP | 2001-177626 | 6/2001 |
| JP | 2001-325252 | 11/2001 |
| JP | 2002-078004 | 3/2002 |

OTHER PUBLICATIONS

United Kingdom Search Report dated Jul. 7, 2003.

Japanese Office Action dated Sep. 11, 2007 (with partial English translation).

English Translation of the Chinese Office Action dated Apr. 30, 3004.

* cited by examiner

FIG. 5A

<LEARNING FUNCTION SETTING MENU>

SELECT ON OR OFF

ON FOR LEARNING FUNCTION

OFF FOR LEARNING FUNCTION

FIG. 5B

<AREA SCALE SETTING MENU>

SELECT AREA SCALE

PREFECTURE

DISTRICT

COUNTRY

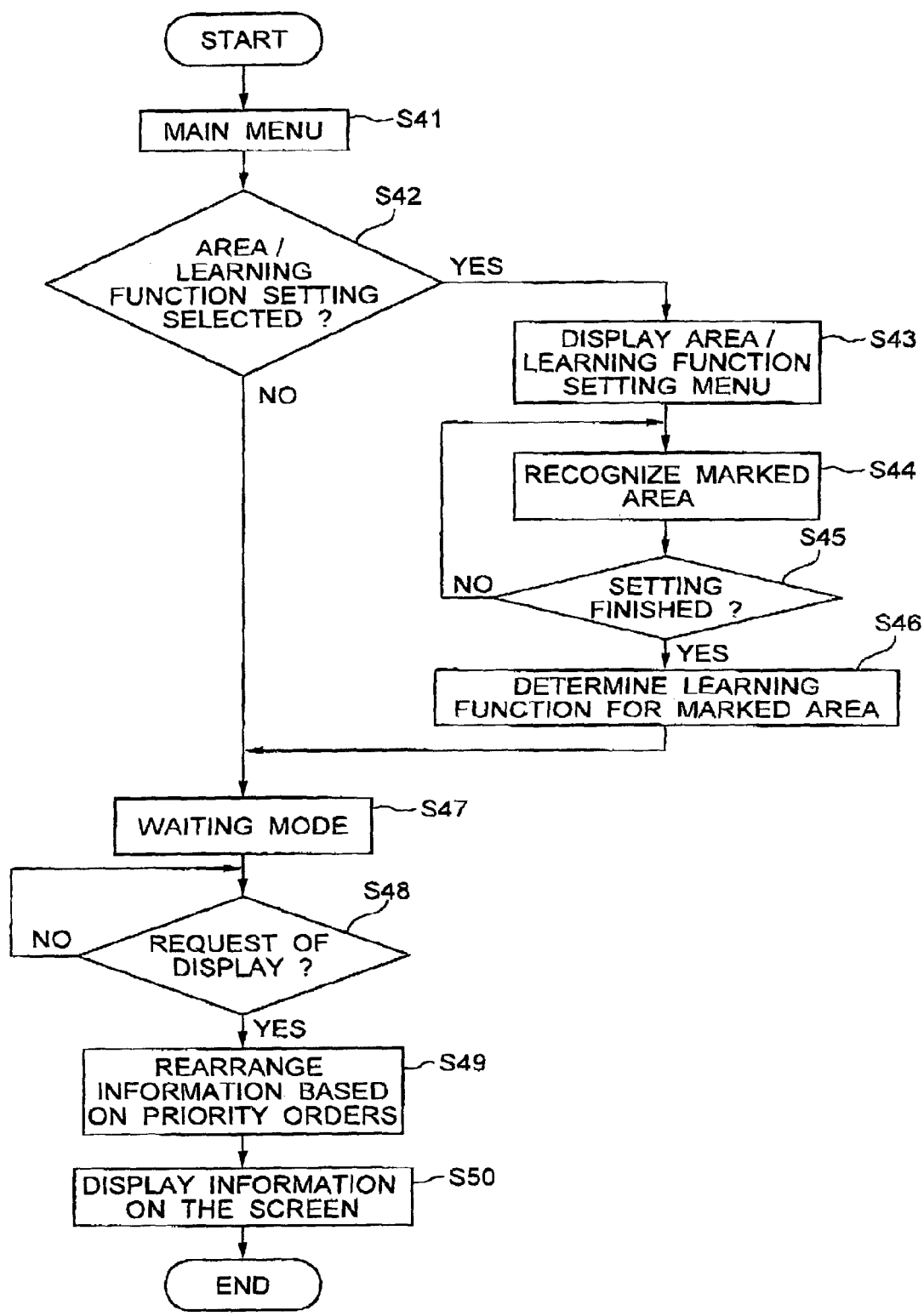

FIG. 7

<AREA / LEARNING FUNCTION SETTING MENU>

| | |
|---|---|
| FIRST PREFECTURE | ON/OFF |
| SECOND PREFECTURE | ON/OFF |
| ⋮ | |
| N-tH PREFECTURE | ON/OFF |

FINISH

FIG. 9A

```
<GROUP SELECTING MENU>

SELECT ONE OF GROUPS

FIRST GROUP
    SECOND GROUP
    THIRD GROUP
        ⋮
```

FIG. 9B

```
<AREA SELECTING MENU>

MARK AREAS

☑ FIRST PREFECTURE
  ☐ SECOND PREFECTURE
        ⋮
  ☐ N-tH PREFECTURE

[FINISH]
```

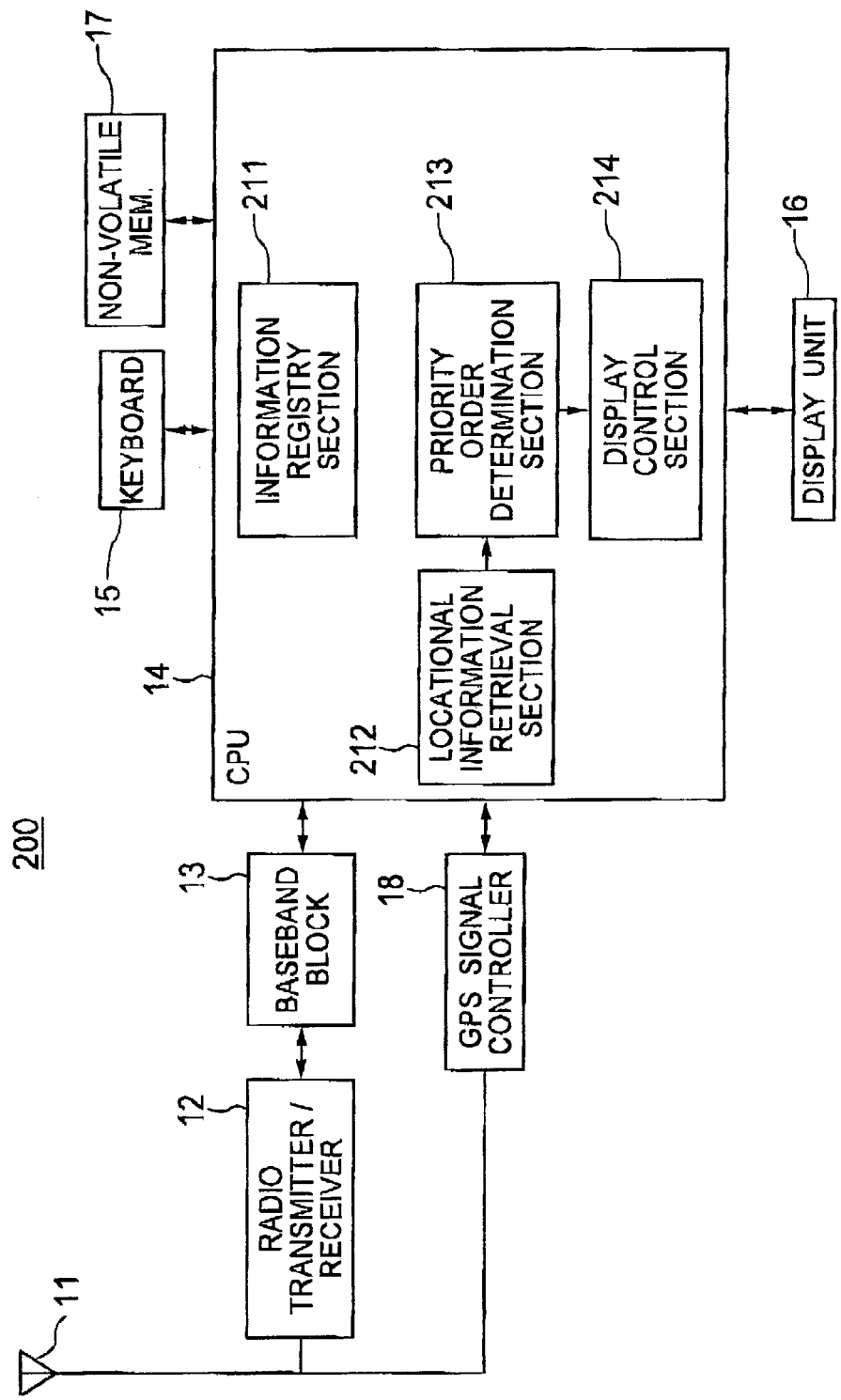

DATA TERMINAL HAVING A TELEPHONE FUNCTION

BACKGROUND OF THE INVENTION (a) Field of the Invention

The present invention relates to a data terminal having a telephone function and, more particularly, to a data terminal having a telephone function and a function for affixing priority orders to the information stored therein.

(b) Description of the Related Art

Some portable data terminals, such as cellular phone, personal handyphone system (PHS) and personal digital assistant, have a function for providing priority orders for a plurality of data stored therein. The priority order is generally determined based on the frequency at which the data is used by the user.

For example, in the telephone directory file of the cellular phone, the telephone numbers stored therein can be arranged on the screen of a display unit in the order of the call frequencies at which the cellular phone originates calls to or receives calls from the telephone numbers.

Also in the kana-kanji character conversion function provided in the e-mailer of the cellular phone, the characters and symbols are arranged on the screen in the order of the frequencies at which the characters and symbols are fixed in the character conversion. This function allows the user to effectively use the information stored in the cellular phone.

It is to be noted that "kana" is a phonetic character system used in Japanese language and is generally used by the user to input a sentence via a keyboard. On the other hand, "kanji" is a meaning-defining character system also used in Japanese language, and a single word specified in kana characters corresponds to a variety of kanji characters or a variety of kanji character series. The sentence in Japanese language is generally represented by a mixture of kanji characters and kana characters, because kana character system alone cannot provide a clear understanding in the meaning and kanji character system alone cannot provide the relationship between the characters. Thus, kana-kanji character conversion technique is used to represent the sentence while replacing some of the kana characters by kanji characters retrieved from a kana-kanji conversion dictionary, which provides a plurality of kanji characters or a plurality of kanji character series as candidates for a single word input by the user.

It is noted by the inventor that the information to be used by the user in the portable data terminal differs from time to time depending on the area at which the user stays. For example, assuming that the user stays in a remote city, the user may originate frequent calls to a store residing in the remote city although the user seldom originates a call to the store before that stay in the remote city.

SUMMARY OF THE INVENTION

In view of the above, it is an object of the present invention to provide a portable data terminal having a function for providing optimum information to the user depending on the area in which the user stays.

The present invention provides a data terminal including: a storage device for storing therein a plurality of first data; a locational information acquisition section for acquiring locational information of the data terminal; priority order determination section for determining priority orders of the first data based on the locational information; and an information output section for providing at least one of the first data having a higher priority order among the first data.

In accordance with the portable data terminal on the present invention, since the cellular phone provides to the user information stored in the storage device in the order of arrangement based on the priority orders of the information, the user can use the information stored in the cellular phone more effectively.

In the present inventions a portable data terminal, such as a personal data assistant, having therein a telephone function is referred to as a cellular phone.

The above and other objects, features and advantages of the present invention will be more apparent from the following description, referring to the accompanying drawings.

BRIEF DESCRIPTION OF THE DRAWINGS

FIG. 5A is an example of the screen image for mode setting in the learning function, and FIG. 5B is an example of the screen image for mode setting in the scale of area.

FIG. 6 is a flowchart of a procedure for area setting in the cellular phone of FIG. 1.

FIG. 7 is an example of the screen image for the area setting.

FIGS. 9A and 9B are examples of the screen images for group setting and area setting, respectively, in the procedure of FIG. 8.

FIG. 10 is a block diagram of a cellular phone shown as a data terminal according to a second embodiment of the present invention.

PREFERRED EMBODIMENTS OF THE INVENTION

Figure 1:
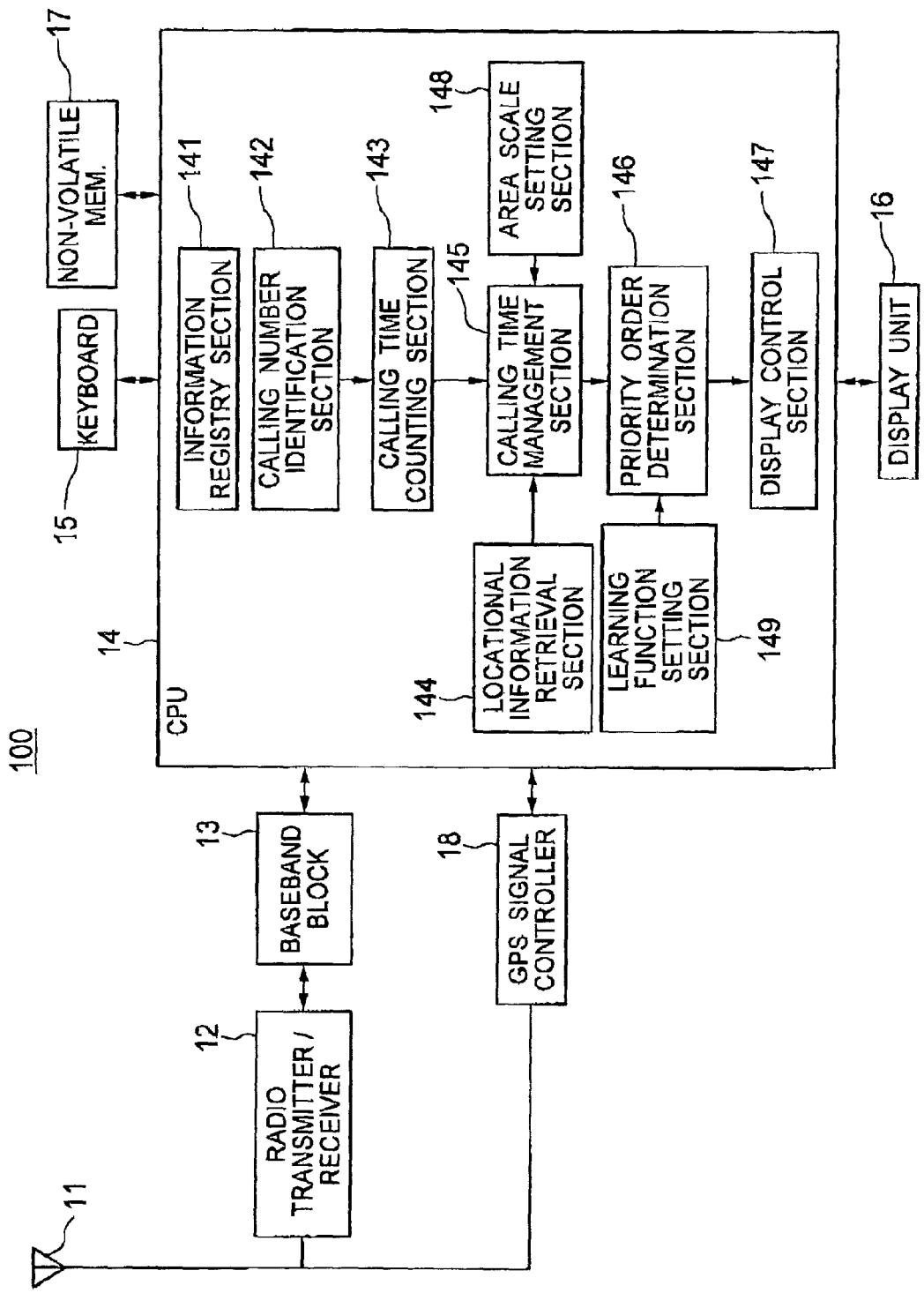
FIG. 1 is a block diagram of a cellular phone shown as a data terminal according to a first embodiment of the present invention.

Now, the present invention is more specifically described with reference to accompanying drawings, wherein similar constituent elements are designated by similar reference numerals.

Referring to FIG. 1, a cellular phone, generally designated by numeral 100, shown as a data terminal according to a first embodiment of the present invention includes an antenna 11, a radio transmitter/receiver 12, a baseband block 13, a CPU 14, input devices including a keyboard 15, a display unit 16, a non-volatile memory 17, and a GPS (global positioning system) signal controller 18.

The radio transmitter/receiver 12 transmits/receives a radio signal including a call number via the antenna 11 to/from a base station (not shown) The baseband block 13 encodes the data to be transmitted by the radio transmitter/receiver 12 and decodes the data received by the radio transmitter/receiver 12. The CPU 14 operates based on programs stored therein to control the overall operation of the cellular phone 100. The keyboard 15 is used for inputting a call number, registering information such as telephone number and name in the non-volatile memory 17, requesting display of the information registered in the non-volatile memory 17.

The display unit 16 displays thereon information input via the keyboard 15, the telephone number to which a call is originated in the cellular phone or from which a call is received, and information registered in the non-volatile memory 17 upon a request from the user via the keyboard 15. The GPS signal controller 18 receives GPS signals from the satellites of the GPS. The keyboard 15 includes about twenty key switches and/or a dial such as a jog dial (trade mark).

The CPU 14 includes therein a processor, a RAM and a ROM, which stores therein data and the program to be run on the processor. The CPU 14 operates based on the programs to function as information registry section 141, call number identification section 142, calling time counting section 143, locational information retrieval section 144, calling time management section 145, priority order determination section 146, display control section 147, area scale setting section 148, and learning function setting section 149.

The information registry section 141 receives a request from the user via the keyboard 15 to register (or store) a name and a telephone number thereof in the telephone directory file, and manages the registered telephone numbers etc. in the telephone directory file.

The call number identification section 142 identifies the call number such as a destination/originating number upon originating/receiving a call in the cellular phone. The calling time counting section 143 counts the number of calls upon identification of the call number by the call number identification section 142 for each of areas. The locational information retrieval section 144 retrieves the location of the cellular phone 100 from the GPS signal controller 18, thereby storing therein the current locational information of the cellular phone.

The calling time management section 145 receives the number of calling times counted by the calling time counting section 143, adding the number of calling times to the current number of calling times stored therein for the area, to thereby manage the number of calling times for each of the areas based on the areas determined by the locational information. For example, assuming that the whole service area of the cellular phone is divided into prefectures (as unit areas), and that the user originates calls and receives calls in a specific prefecture by using the cellular phone, the calling time counting section 143 counts the number of calling times for the specific prefecture based on the current locational information, delivers the count to the calling time management section 145, which adds the received count to the current number of calling times for the specific prefecture.

The priority order determination section 146 determines the priority orders of the prefectures based on the number of calling times for each of the prefectures after retrieving the telephone numbers registered in the telephone directory file. That is, the priority order determination section 146 determines the priority orders of the unit areas, allowing the telephone numbers to be arranged on the screen of the display unit in the descending order of the calling times for the unit areas.

For example, if the number of calling times stored are "1", "10" and "5" for first through third prefectures, respectively, the registered telephone numbers are arranged on the screen such that the telephone numbers belonging to the second prefecture, telephone numbers belonging to the third prefecture and the telephone numbers belonging to the first prefecture are arranged in this order. The prefecture of each telephone number is detected by the calling code of the telephone number. The order of this arrangement is managed based on the priority order managing file stored in the non-volatile memory 17.

The priority order determination section 146 determines the priority orders while following the mode set by the learning function setting section 149 during managing the priority orders in the priority order managing file.

The display control section 147 controls the display unit 16 to display the telephone numbers and the associated names on the screen thereof in the order of arrangement determined by the priority order determination section 146, and may also control the display unit 16 to display the telephone numbers on the screen thereof in the alphabetic order of the names instead.

The area scale setting section 148 sets the area scale based on the request input by the user via the keyboard 15. The unit area to be set by the area scale setting section 148 may be the prefecture, as described above, or the district, such as Kanto district or Kansai district, including several prefectures and also may be the country such as Japan, USA and China. The unit area may be city, town or village instead. The calling time management section 145 stores and manages the number of calling times for the unit area specified by the area scale setting section 145.

The learning function setting section 149 sets a first mode or a second mode for the arrangement of the telephone numbers in the telephone directory file based on the request input by the user via the keyboard 15. The first mode is such that the telephone numbers are arranged in the order corresponding to the priority orders specified by the priority order determination section 146, whereas the second mode is such that the telephone numbers are arranged in the alphabetic order of the associated names.

Figure 2:
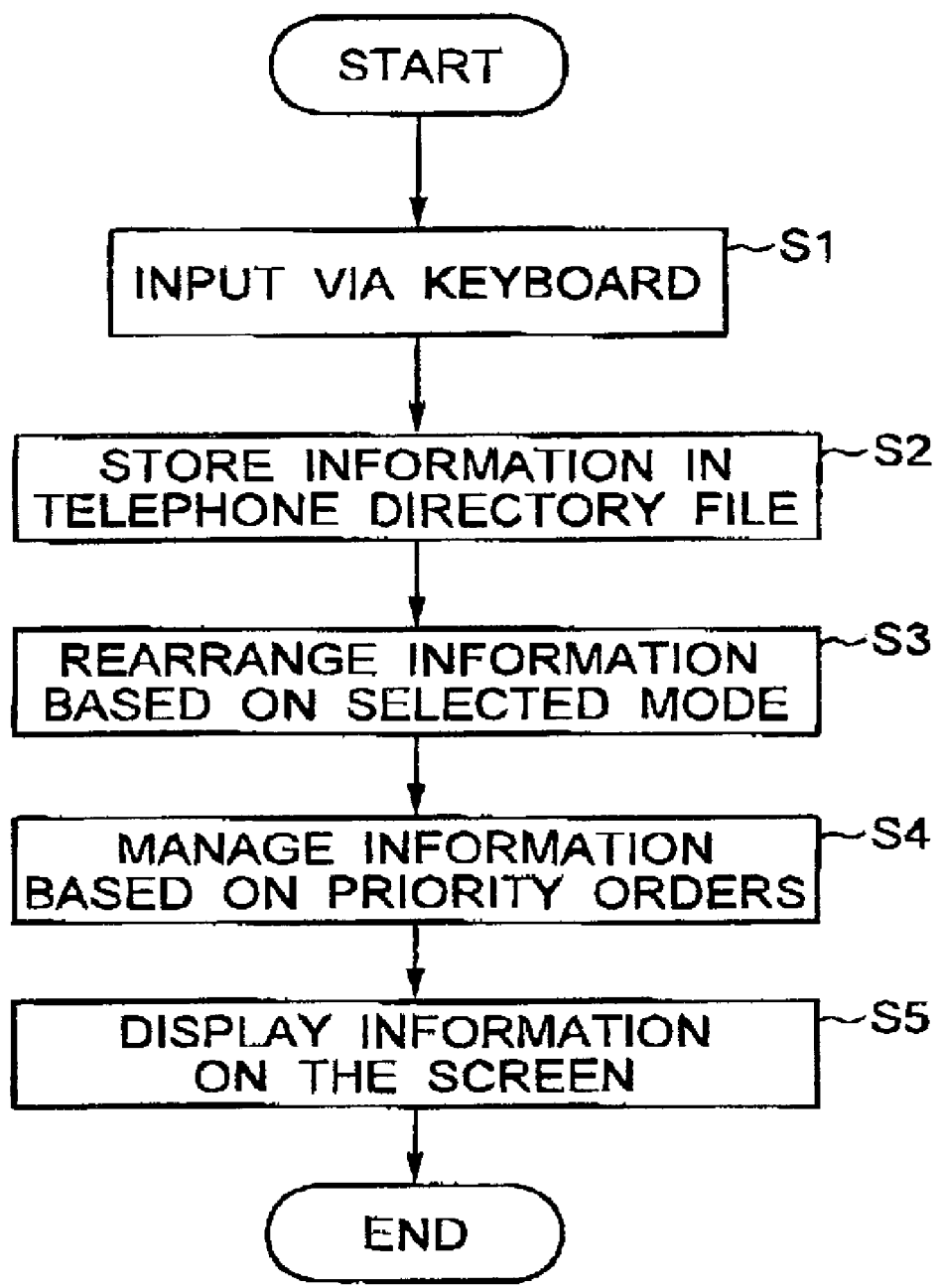
FIG. 2 is a flowchart of a procedure for registering and retrieving the information in the telephone directory file in the cellular phone of FIG. 1.

Referring to FIG. 2, there are shown procedures from the registry of the telephone numbers in the telephone directory file to the display of the telephone numbers stored in the telephone directory file.

In step S1 information of the telephone number and the corresponding name thereof is input by the user via the keyboard 15. If instruction of registry is selected after completion of the input of the information, the information registry section 141 registers the input information in the telephone directory file (step S2). The priority order determination section 146 rearranges the telephone numbers read from the telephone registry file based on the mode selected beforehand (step S3), and then manages the order of the telephone numbers in the priority order management file based on the selected mode (step S4). The display control section 147 controls the display unit 16 to display the telephone numbers in the order of arrangement based on the priority order management file (step S5).

Figure 3:
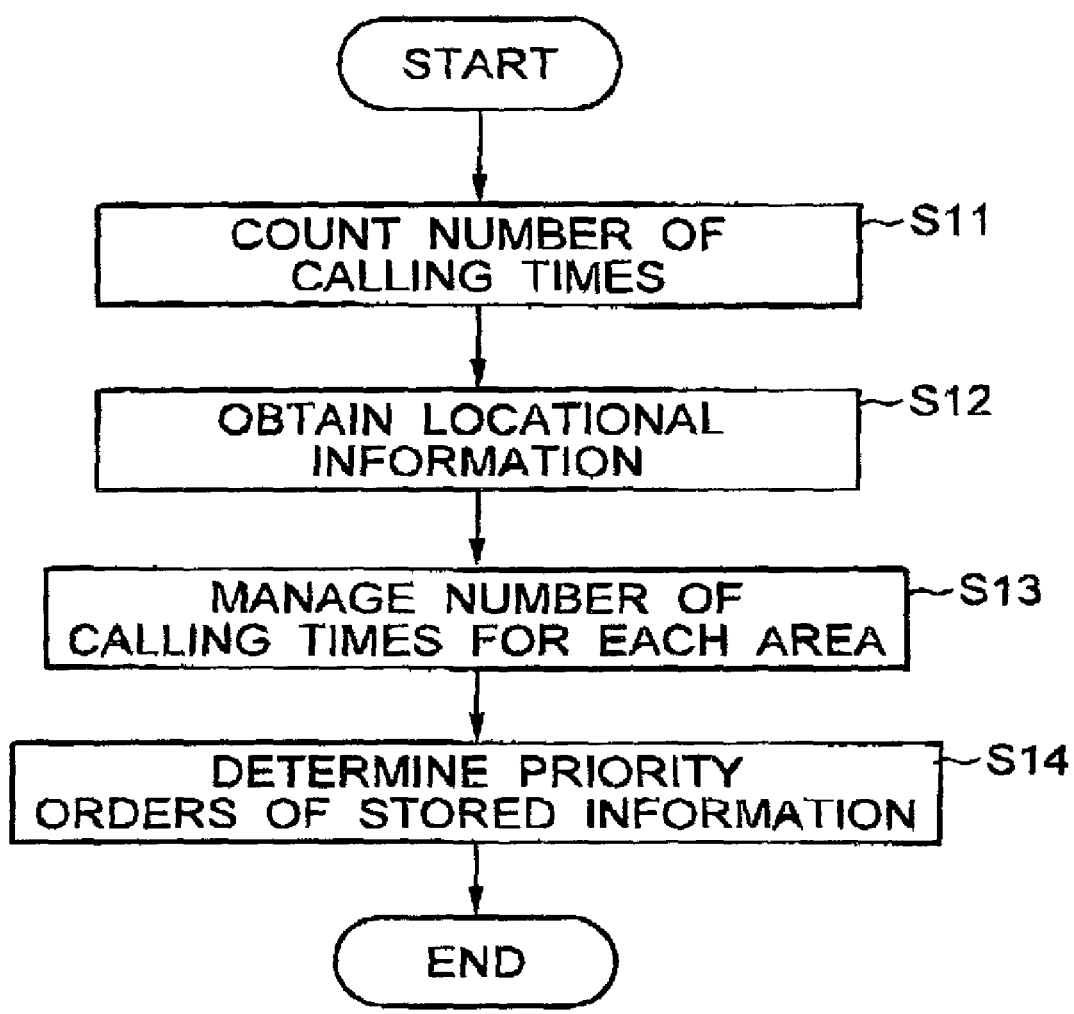
FIG. 3 is a flowchart of a procedure for determining the order of display in the cellular phone of FIG. 1.

Referring to FIG. 3, there are shown procedures by the CPU during determination of the priority orders of the areas and order of the arrangement of the telephone numbers based on the number of calling times for the respective areas.

If the user originates a call or receives a call in the cellular phone 100, the call number identification section 142 recognizes the destination or originating terminal of the call, and the calling time counting section 143 increments the number of calling times therein (step S11). The locational information retrieval section 144 then retrieves the current locational information of the cellular phone 100 from the GPS signal controller 18 (step S12). The calling time management section 144 receives the number of calling times counted by the calling time counting section for the area that is identified by the locational information retrieval section 144, adding the number of calling times to the current number of calling times for the area to manage the number of calling times for each of the areas (S13). The priority order determination section 146 then determines the priority orders of the areas based on the current calling times of the respective areas (step S14). After the determination of the priority orders, the procedure advances to the procedure shown in FIG. 2, wherein steps S3 to S5 are conducted.

Figure 4:
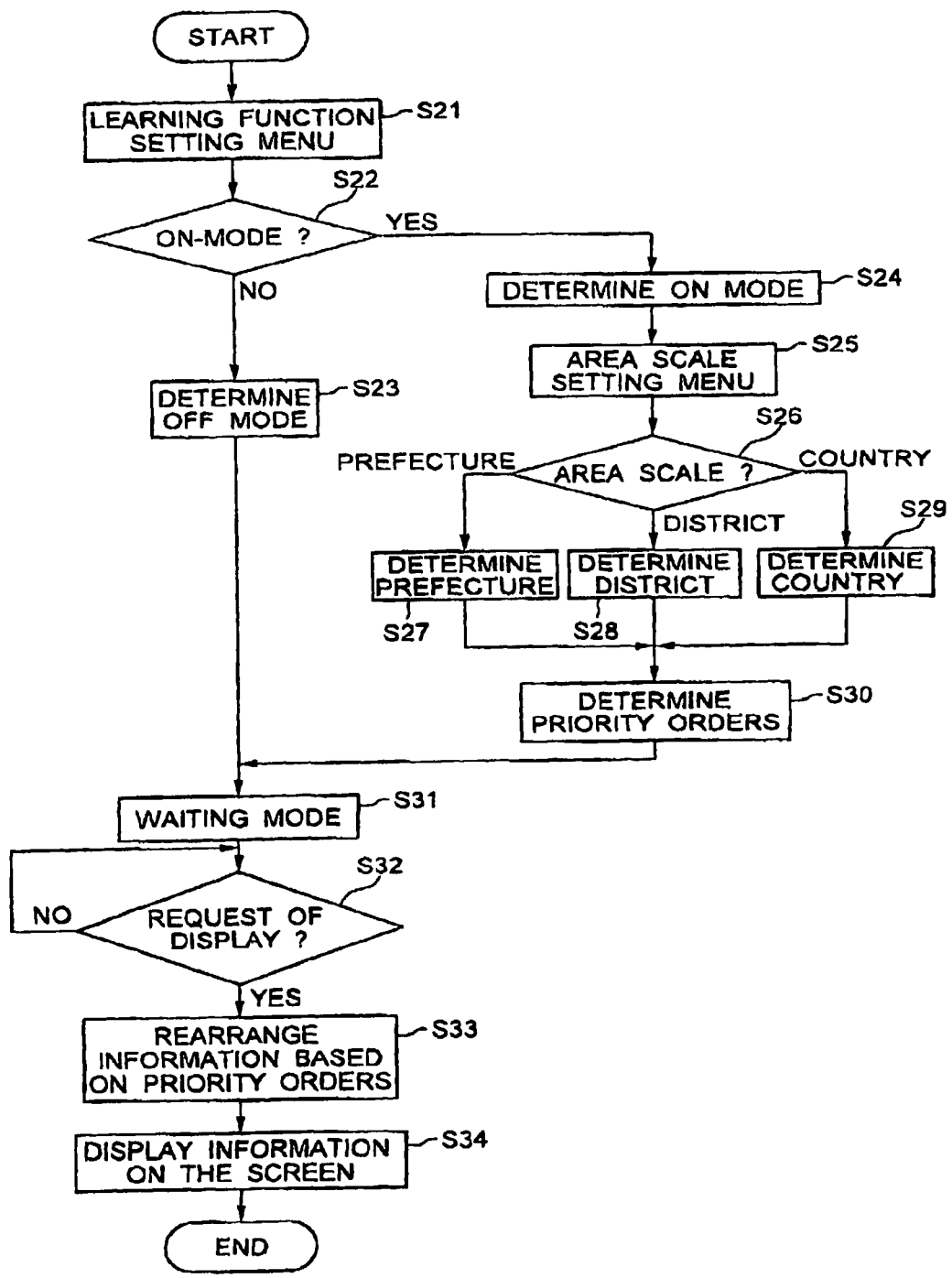
FIG. 4 is a flowchart for the operational mode setting in the cellular phone of FIG. 1.

Referring to FIG. 4, there is shown the procedure of the CPU during mode setting. FIG. 5A exemplifies the image on the screen during the step of learning function setting in the procedure of FIG. 4, whereas FIG. 5B exemplifies the image on the screen during the step of area scale setting in the procedure of FIG. 4.

After the user selects a mode setting menu from a main menu on the screen of the display unit 16, the screen represents thereon the learning function setting image shown in FIG. 5A (step S21). The user is urged to select either "ON mode" or "OFF mode" for the learning function in the menu. If the user selects the "OFF mode" for the learning function (step S22), then the learning function setting section 149 determines the OFF mode for the learning function (step S23). On the other hand, if the user selects "ON mode" for the learning function (step S22), then the learning function setting section 149 determines the ON mode for the learning function (step S24).

If the "ON mode" is selected in the above procedure, the screen of the display unit 16 represents thereon the area scale setting menu depicted in FIG. 5B (step S25). The user is urged in the menu to select the unit area for which the number of calling times is counted. If the user selects "prefecture" in the menu in step S26, the area scale setting section 148 determines "prefecture" as the unit area (step S27). The calling time management section 145 thereafter manages the number of calling times for each of the prefectures, the number of calling times being counted by the calling time counting section 143. For example, the calling time management section 145 stores and manages the number of calling times for each of the prefectures, such as "1" for Tokyo, "10" for Chiba prefecture, and "5" for Saitama prefecture.

On the other hand, if the user selects "district" in the area scale setting menu in step S26, the area scale setting section 148 determines the district as the unit area. The calling time managing section 145 thereafter stores and manages the number of calling times for each of the districts, such as "5" for Kanto district, "15" for Kansai district and "20" for Shikoku district.

Otherwise, if the user selects "country" in the area scale setting menu in step S26, the area scale setting section 148 determines the country for the unit area (step S29). The calling time management section 145 thereafter stores and manages the number of calling times for each of the country, such as "15" for Japan, "15" for USA and "20" for China, although such a situation is not yet established in the current cellular phone system After the mode setting is completed, the priority order determination section 146 re-calculates and determines the priority orders of the areas based on the calling times for each of the unit areas established in the area scale setting procedure (step S30). After the setting procedure is completed, the image of the screen represents a waiting mode (step S31).

Thereafter, if the user requests via the keyboard 15 display of telephone numbers stored in the telephone directory file (step S32), the display control section 147 rearranges the order of the telephone numbers stored in the telephone directory file based on the selected "on mode" or "off mode" (step S33), and then controls the display unit 16 to display thereon the telephone numbers thus rearranged (step S34). It is to be noted that if the "ON mode" has been selected, the order of the telephone numbers on the screen follows the order determined by the priority order determination section 16, whereas if the "OFF mode" has been selected, the order of the telephone numbers on the screen follows the alphabetic order for the names.

Referring to FIG. 6, there is shown a procedure by the CPU during the procedure of area/learning function setting. FIG. 7 shows the area/learning function setting menu displayed during the area/learning function setting. It is assumed that "prefecture" is selected as the unit area in the area scale setting procedure.

When the main menu is displayed on the screen (step S1), the user is urged to select one of the modes including an area/learning function setting mode. If the user selects the area/learning function setting mode in step S42, the image of the screen represents the area/learning function setting menu shown in FIG. 7 (step S43). The user is urged to select ON or OFF for each of the prefectures arranged on the screen. Thus, the user determines ON or OFF of the learning function for each of the prefectures. The area scale setting section 148 recognizes the selection for each of the prefectures (step S44). If all the selection for each of the prefectures is completed (step S4), then the area scale setting section 148 sets ON mode for the prefectures for which ON is selected by the user (step S46). It is to be noted that the prefectures for which On is set for the learning function are the unit areas for which the telephone numbers are arranged in the order determined by the priority order determination section 146. Thus, the area/learning function setting procedure is finished.

As will be understood from FIG. 6, steps S47 to S50 are similar to steps S31 to S34 in FIG. 4. Thus, these steps S47 to S50 are omitted herein for detailed description. Thereafter, the order of the telephone numbers on the screen follows the priority orders of the unit areas.

According to the first embodiment, since the cellular phone arranges the telephone numbers or information stored in the telephone directory file in the order of the numbers of the calling times for each specified unit areas, an optimum arrangement can be obtained for the information stored in the cellular phone.

It is to be noted that the several unit areas as described above may be grouped to form a larger area for which the number of calling times is managed. In such a case, the order of the arrangement may be selected to follow the number of the calling times in the area or in the group. In this case, the CPU includes a group registry section in the area scale setting section 148.

Figure 8:
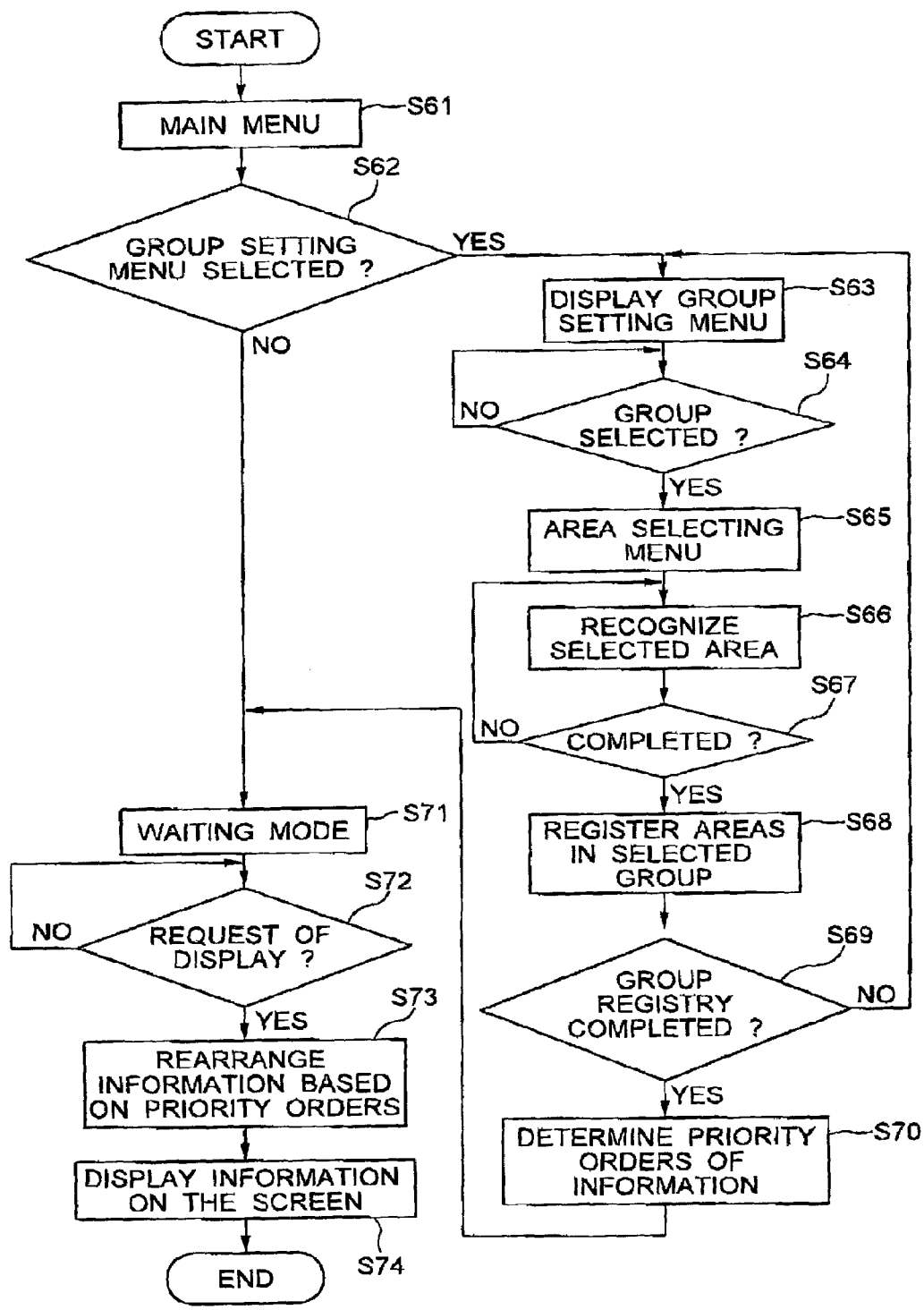
FIG. 8 is a flowchart of a procedure for group setting in the cellular phone of FIG. 1.

Referring to FIG. 8, there is shown the procedure for the group setting by the group registry section. FIG. 9A shows a group selection menu used in the procedure of FIG. 8, whereas FIG. 9B shows an area setting menu used in the procedure of FIG. 8.

After the main menu is displayed on the screen (step S61), the user may select the group setting menu shown in FIG. 9A (step S62). The group setting menu urges the user to select one of first to n-th groups on the screen (step S63). If the user selects the first group on the screen, for example, in step S64, then the area setting menu shown in FIG. 9B is displayed on the screen (step S65). The user is urged to select some of the prefectures on the screen by marking the boxes for the prefectures, thereby selecting the prefectures to be grouped in the first group. The group registry section, which is installed in the area scale setting section 148, recognizes the selected prefectures for the first group (step S66). If the user finishes the grouping for the first group (step S67), the group registry section registers the first group and the corresponding prefectures included therein (step S68).

Then, since the grouping in not yet complete (step S68), the process returns to step S63 to iterate steps S63 to S69, whereby the user selects the second and subsequent groups and selects several prefectures for each of the second and subsequent groups, similarly to the case of the first group. After the user selects "finish" of the grouping (step S69), the calling time managing section calculates, stores and manages the number of calling times for each of the groups thus formed. That is, the number of calling times for the group is the sum of the numbers of calling times for the prefectures in the group.

The priority order determination section 146 determines the order of the telephone numbers based on the number of calling times for the group of the prefectures (step S70). For example, if the number of calling times are 10, 20 and 50 for the first through third groups, respectively, the order follows the order of telephone numbers belonging to the third group, second group and first group. Thus, the telephone code is detected for each of the telephone numbers to detect the group of prefectures. The order thus obtained is stored as an order file in the non-volatile memory 17. The display control section controls the display unit 16 to display thereon the telephone numbers in the order of arrangement thus determined by the priority order determination section 147 (steps S71 to S74).

In the above embodiment, the unit area may be city (village), district or country instead of prefecture. The cellular phone may be replaced by another data terminal such as PHS or PDA having a telephone function.

In a modification of the first embodiment, the number of calling times of each telephone number may be stored for the area in which the cellular phone resides. In this case, the telephone numbers have respective priority orders for each area, and displayed on the screen in the order of the priority orders for each current area in which the cellular phone resides. In an alternative the priority orders of the telephone numbers are converted into the priority orders of the areas based on the telephone codes of the telephone numbers. Thus, the telephone numbers are displayed in the order of the prefectures (unit areas) having higher priorities toward the prefectures having lower priorities for each current area of the cellular phone.

Referring to FIG. 10, there is shown a cellular phone 200 as a portable data terminal according to a second embodiment of the present invention. Constituent elements denoted by similar reference numeral in the embodiments of the present invention have similar functions, and thus detailed description thereof are omitted herein for avoiding a duplication.

The CPU 14 operates on the programs to function as an information registry section 211, a locational information retrieval section 212, a priority order determination section 213 and a display control section 214.

Figure 11:
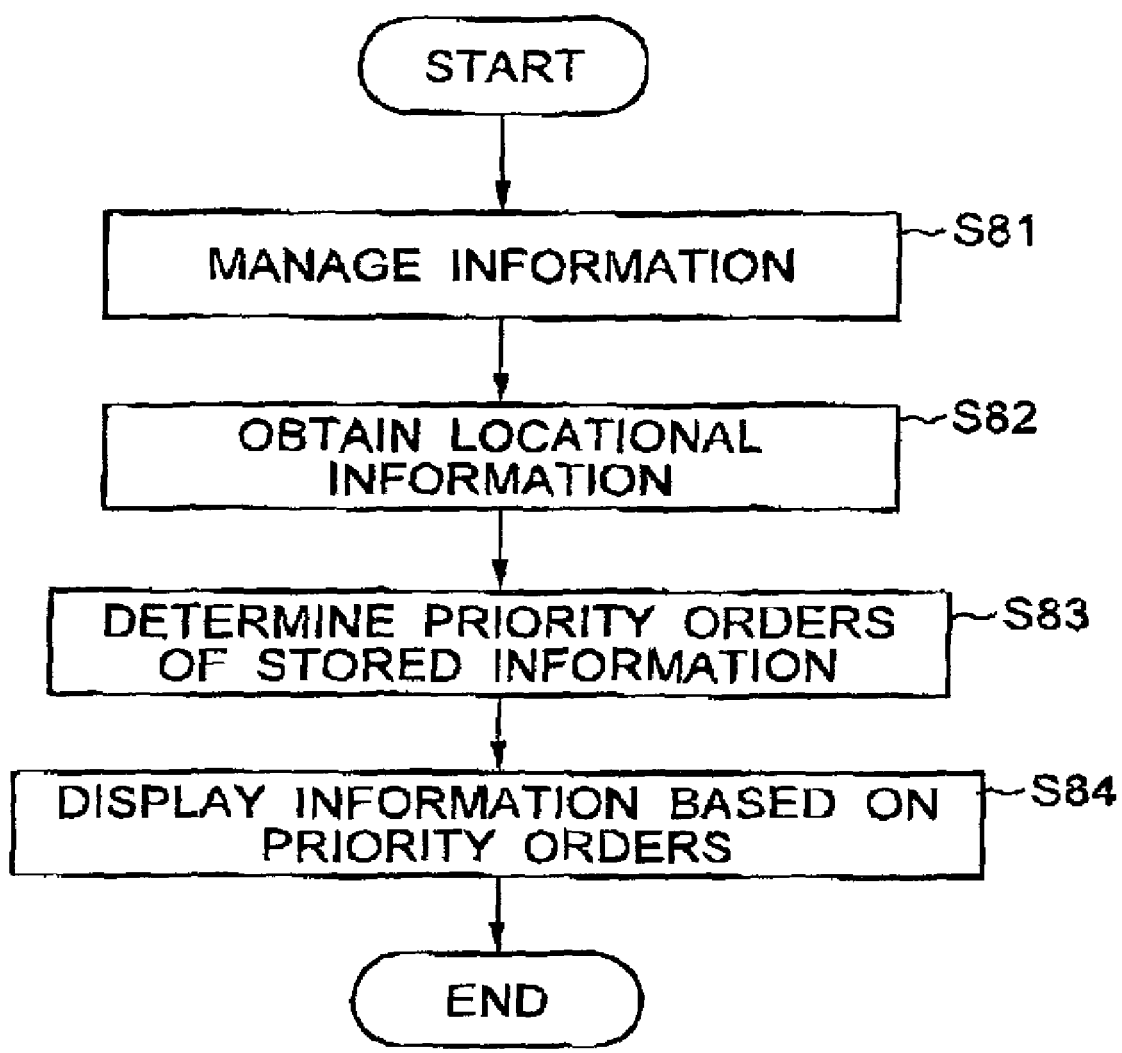
FIG. 11 is a flowchart of a procedure for image display in the cellular phone of FIG. 10.

Referring to FIG. 11, there is shown a procedure from information registry and information display conducted by the CPU 14. First, the information registry section 211 receives information input by the user via the keyboard 15 to store and manage the information including telephone numbers and corresponding names in the telephone directory file (step S81). The locational information retrieval section 212 receives the current locational information of the cellular phone 200 from the GPS signal controller 18 (step S82).

The priority order determination section 213 determines the priority orders the telephone numbers based on the current locational information received from the locational information retrieval section 212 (step S83). More specifically, the priority order determination section 213 recognizes the current area in which the cellular phone resides, extracts the telephone numbers from the telephone directory file, and rearranges the order of the telephone numbers while providing priority orders to the telephone numbers each having a calling code corresponding to the current area. The display control section 214 controls the display unit 16 to display thereon the telephone numbers and names in the order specified by the priority order determination section (step S84).

The information arranged on the screen may be information stored in a dictionary file, a plurality of dictionary files, or a plurality of character code files other than the telephone directory file as described above.

In the kana-kanji character conversion procedure, for example, if the candidate kanji characters stored in the dictionary file are to be arranged on the screen by the technique of the present invention, the priority order determination section 213 retrieves the candidate kanji characters, determines the order of the arrangement of the kanji characters based on the current locational information. Thereafter, the display control section 214 controls the display unit 16 to represent the candidate kanji characters on the screen in the order of arrangement specified by the priority order determination section 213.

In the above arrangement, if the cellular phone resides in a specific area, the geographic names represented by kanji characters and retrieved from the dictionary for the kana-kanji character conversion are arranged so that the geographic name nearest to the specific area is arranged in the first row and that the other geographic names are arranged in the ascending order of the distances between the specific area and the geographic names.

In another example, if a plurality of dictionaries are stored for kana-kanji conversion in the cellular phone, and the cellular phone resides in a specific prefecture, then the priority order determination section selects one of the dictionaries most suited to the specific prefecture. In this case, if the user inputs some kana characters for specifying at least a part of a geographic name, the candidate kanji characters are arranged in the order most suited to the specific prefecture by the function of the selected dictionary.

In a further example, wherein country is selected as the unit area, a plurality of character code files (or dictionaries) used in respective countries are stored in the non-volatile memory 17. The priority order determination section 213 determines one of the character code files based on the country in which the cellular phone resides.

In the second embodiment, the cellular phone provides information best suited to the area in which the cellular phone resides.

In the first or second embodiment, the data terminal is not limited to the cellular phone and may be a personal digital assistant or a personal computer having a GPS function. The GPS function itself may be provided in the data terminal as in the above embodiments and also may be provided outside the data terminal, e.g., in the central station of the communication common carrier. In this case, the central station obtains the locational information of the cellular phone based on the base station receiving the signal from the cellular phone and transmits the locational information to the cellular phone. In addition, although the above embodiments are described mostly with reference to the kana-kanji conversion technique, the present invention can be extended to a translation technique such as an English-to-Chinese or Chinese-to-English conversion technique.

Since the above embodiments are described only for examples, the present invention is not limited to the above embodiments and various modifications or alterations can be easily made therefrom by those skilled in the art without departing from the scope of the present invention.

What is claimed is:

1. A cellular telephone comprising:
    a storage device for storing therein a plurality of telephone numbers;
    a locational information acquisition section, responsive to a received electromagnetic signal, for acquiring locational information comprising a location of said cellular telephone;
    a call counting section for counting a respective number of calls for said telephone numbers made from said location based on said locational information;
    a priority order determination section for determining a priority order for said telephone numbers based on said acquired locational information and said respective number of calls; and
    an information output section for providing at least one of said telephone numbers higher in said priority order from among said telephone numbers.

2. The cellular telephone according to claim 1, wherein said information output section further provides a remaining part of said telephone numbers after said at least one said telephone numbers so that said telephone numbers are arranged in an order of said priority orders.

3. The cellular telephone according to claim 1, wherein said priority order determination section is selectively activated.

4. The cellular telephone according to claim 1, wherein said locational information acquisition section comprises a global positioning system (GPS) unit.

5. The cellular telephone according to claim 1, wherein said location of said cellular telephone comprises an area.

6. The cellular telephone according to claim 5, further comprising means for scaling said area.

7. A cellular phone comprising:
    a telephone directory file for registering therein a plurality of telephone numbers;
    an area identification section for identifying an area of said cellular phone from among a plurality of areas based on locational information of said cellular phone;
    a counting section for counting a number of calls for respective ones of said plurality of telephone numbers in each of said areas;
    a priority order determination section far determining priority orders of said areas and said respective ones of said plurality of telephone numbers based on said number of calls; and
    a display unit for displaying said areas and said respective ones of said plurality of telephone numbers in one of said priority orders.

8. The cellular phone according to claim 7, further comprising an area scale setting section for setting a scale for said plurality of areas.

9. The cellular phone according to claim 7, further comprising a group registry section for registering each of said areas in one of a plurality of groups, wherein:
    said priority order determination section further determines other priority orders of said groups, said other priority orders being determined based on the sum of the numbers of calls of said areas in each group; and
    said display unit displays said telephone numbers in an order of said other priority orders.

10. The cellular phone according to claim 7, wherein said priority order determination section is selectively activated.

11. The cellular phone according to claim 7, wherein said cellular phone comprises a personal digital assistant.

12. The cellular phone according to claim 7, wherein said area identification section comprises a GPS unit.

13. The cellular phone according to claim 7, wherein said calling time counting section determines an area of a called telephone number based on a calling code of the called telephone number.

14. A computer readable medium encoded with a computer program on which a control processing unit (CPU) is run for operating a cellular phone, said program being capable of causing said CPU to:
    determine an area of the cellular phone from among a plurality of areas based on indicated locational information of the cellular phone;
    count a number of calling times for telephone numbers in each of said areas;
    determine priority orders of said telephone numbers for each of the areas based on the number of calling times in said determined area of the cellular phone; and
    display the telephone numbers in an order of the priority orders.

15. The recording medium according to claim 14, wherein said counting the number of calling times for each of said areas includes determining an area of a called telephone number based on a calling code of the called telephone number.

* * * * *